(12) United States Patent
Sharpe et al.

(10) Patent No.: US 7,762,758 B2
(45) Date of Patent: Jul. 27, 2010

(54) DIRECTIONAL BUSHING

(75) Inventors: Peter Sutherland Sharpe, St Catherines (CA); Scott Robert Jamieson, Welland (CA)

(73) Assignee: Deere & Company, Moline, IL (US)

( * ) Notice: Subject to any disclaimer, the term of this patent is extended or adjusted under 35 U.S.C. 154(b) by 344 days.

(21) Appl. No.: 11/489,794

(22) Filed: Jul. 20, 2006

(65) Prior Publication Data

US 2008/0042017 A1    Feb. 21, 2008

(51) Int. Cl.
*E02F 9/00* (2006.01)
(52) U.S. Cl. .................... 414/722; 403/335; 16/2.1
(58) Field of Classification Search .............. 414/722, 414/686; 403/335, 336; 464/132, 119; 16/2.1
See application file for complete search history.

(56) References Cited

U.S. PATENT DOCUMENTS 5,611,657 A * 3/1997 Peterson .................. 414/722
6,656,053 B2 * 12/2003 Chang ..................... 464/119

* cited by examiner

*Primary Examiner*—Donald Underwood

(57) ABSTRACT

A directional bushing is provided for a pinned joint of an articulated structure such as a front end loader used with a work vehicle. The bushing has an annular ring portion and an oblong flange portion. The flange portion extends angularly outward from one side of the ring portion so as to form a wider rounded end. The flange portion is thicker at the area adjacent to the ring portion so as to provide additional support to the ring portion under load, and tapers to a more thin profile at the rounded end. The bushing is surface welded to the structure at the pinned joint with the flange portion oriented in the direction of the greatest load when the structure is articulated, so that the load is more evenly distributed over a wider area, thereby preventing weld failure.

6 Claims, 4 Drawing Sheets
(2 of 4 Drawing Sheet(s) Filed in Color)

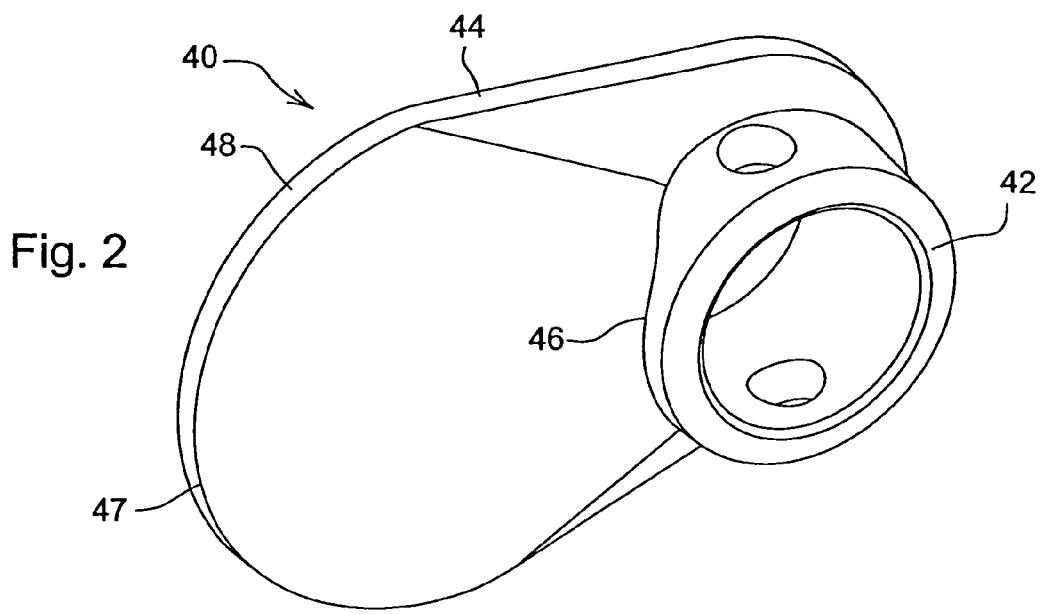
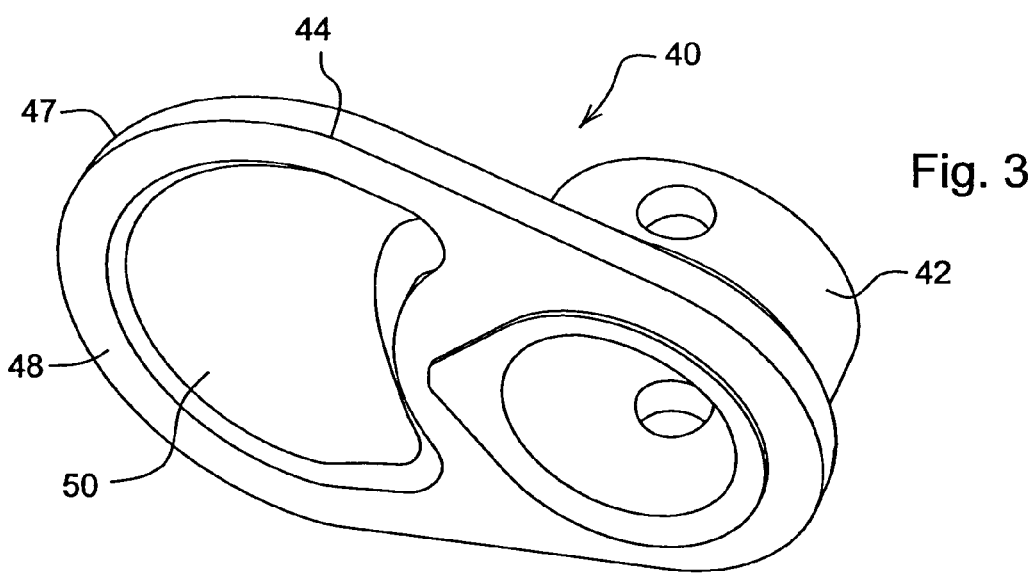
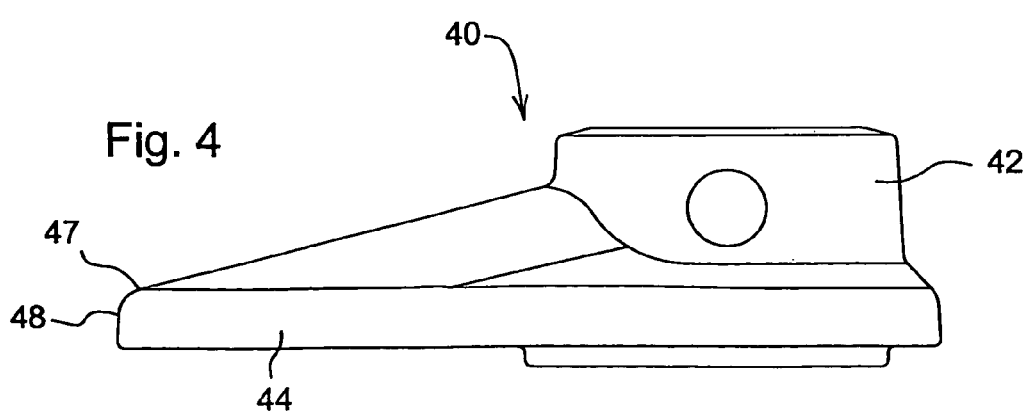

DIRECTIONAL BUSHING

FIELD OF THE INVENTION

The present invention relates generally to agricultural or industrial vehicles. More particularly, the present invention relates to such vehicles having an articulated work implement such as a loader or back hoe. Specifically, the present invention relates to a directional pivot bushing for such articulated implements.

BACKGROUND OF THE INVENTION

In articulated implement applications, such as front end loaders, as used in conjunction with agricultural tractors or industrial vehicles, bushings are employed to provide load distribution in pinned joints. Such bushings are typically made of DOM (Drawn Over Mandrel) tubing and parted to length and, for ease of manufacturing, are frequently surface mounted by fillet welding the bushing directly to e.g. the loader arm. However, in some applications the loading through the pin/bushing joint initiates cracking in the parent material at the weld. For example, in agricultural front end loader applications the lift cylinder-to-boom connection and the boom-to-bell crank connection are both subject to premature cracking at the weld site of such bushing configurations.

Accordingly, there is a clear need in the art for an improved bushing for use in such applications that does not have the above-described difficulties.

SUMMARY OF THE INVENTION

The advantages of the invention over the known art will become apparent from the detailed specification which follows and are attained by a directional bushing for supporting a pinned joint of an articulated structure, the bushing having an annular ring portion and an oblong flange portion, the flange portion being thicker in an area adjacent to said annular ring portion and tapering to a thinner area more distal from the annular ring portion, the flange portion having opposed side edges that diverge angularly outward from the annular ring portion, the side edges being continuous with a rounded end edge, the flange portion being surface welded to the structure at the pinned joint so that the flange portion extends in a direction of pin loading so that loads are transferred from the ring portion to the flange portion whereby the load is spread over a larger weld area.

Other advantages are attained by an improved articulating work implement for use with a work vehicle, the work implement having a boom arm connected to a mounting frame, a work tool pivotally mounted to the boom arm, a first hydraulic cylinder connected between the boom arm and the frame, the first hydraulic cylinder being connected to the boom arm at a first pinned joint, a second hydraulic cylinder connected between the boom arm and the tool, the second hydraulic cylinder being connected to the boom arm at a second pinned joint, such that selective actuation of the hydraulic cylinders causes the boom arm and tool to articulate relative to the frame, the improvement comprising: a directional bushing provided on the boom arm at each of the first and second pinned joints, the bushing having an annular ring portion and an oblong flange portion, the flange portion being thicker in an area adjacent to said annular ring portion and tapering to a thinner area more distal from the annular ring portion, the flange portion having opposed side edges that diverge angularly outward from the annular ring portion, the side edges being continuous with a rounded end edge, the flange portion being surface welded to the second boom at each pinned joint so that the flange portion extend in a direction of pin loading when the boom arm is extended.

In general, a directional bushing is provided for a pinned joint of an articulated structure such as a front end loader used with a work vehicle. The bushing has an annular ring portion and an oblong flange portion. The flange portion extends angularly outward from one side of the ring portion so as to form a wider rounded end. The flange portion is thicker at the area adjacent to the ring portion so as to provide additional support to the ring portion under load, and tapers to a more thin profile at the rounded end. The bushing is surface welded to the structure at the pinned joint with the flange portion oriented in the direction of the greatest load when the structure is articulated, so that the load is more evenly distributed over a wider area thereby preventing weld failure.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a complete understanding of the objects, techniques, and structure of the invention reference should be made to the following detailed description and accompanying drawings, wherein:

FIG. 2 is a perspective front view of a bushing according to the invention;

FIG. 3 is a perspective rear view of a bushing according to the invention;

FIG. 4 is an elevational side view of a bushing according to the invention;

DESCRIPTION OF THE PREFERRED EMBODIMENT

Figure 1:
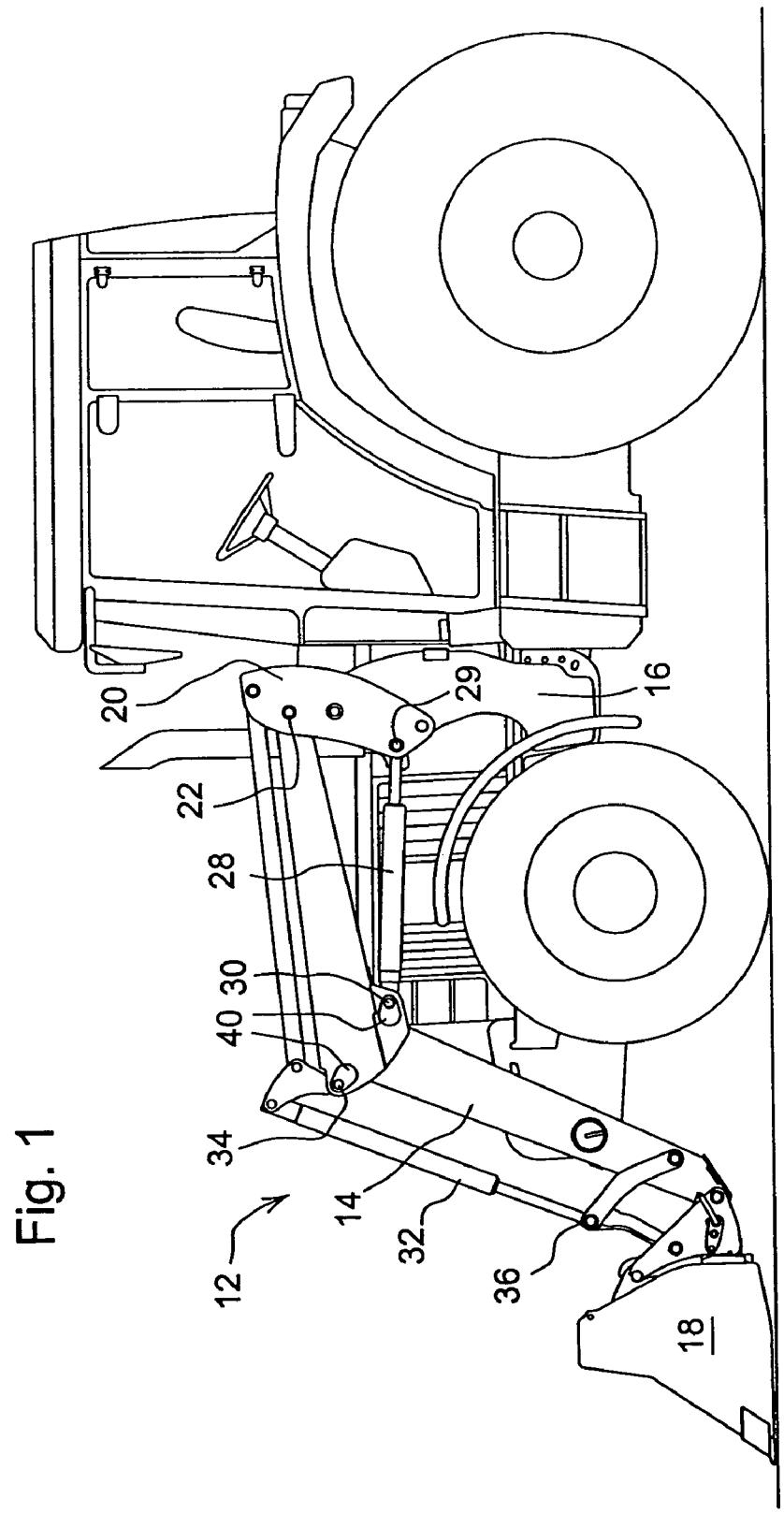
FIG. 1 is a side view of a tractor having a front end loader attachment employing the bushing according to the invention.

With reference now to FIG. 1 it can be seen that an agricultural tractor 10 is equipped with a front end loader attachment 12. As shown the loader 12 is comprised of a boom 14 that is mounted to the tractor 10 by way of a mounting frame 16. A bucket or other work implement 18 is mounted to the boom 14. As can be seen the loader boom 14 is pivotally mounted to the mounting frame 16 through a mast 20 at a point 22. A first hydraulic cylinder 28 is attached to the mounting frame 16 through the mast 20 at an anchor point 29 proximal to the pivot point 22 and to the boom 14 at an anchor point 30. Accordingly through the selective actuation of the hydraulic cylinder 28 the boom 14 can be articulated in a known manner. Similarly a second hydraulic cylinder 32 is connected to the boom 14 at an anchor point 34 and to the work implement 18 at a point 36. Accordingly, selective actuation of the second hydraulic cylinder 32 causes articulation of the implement 18 relative to the boom 14 in a known manner. It can thus be seen that the operator of the tractor can articulate the loader 12 relative to the tractor 10 by operating hydraulic controls in the operator station of the tractor that are operatively connected to a hydraulic system (not shown) of the tractor and loader.

Those having skill in the art will recognize that the various points of articulation of the loader boom 14 are subjected to significant loading forces during operation particularly when the implement 18. In known arrangements the pivot or articulation points typically comprise a bushing which may be through mounted in an aperture in the boom arm or to facilitate manufacturing, surface mounted to the boom arm. A pivot pin then secures the articulating components such as the loader arms or hydraulic cylinders through the bushing.

The results of a Finite Element Analysis described below led to the present invention which comprises a specially shaped bushing as shown in FIGS. 2-4 to more evenly distribute the load on the bushing and weld and lower the amount of stress in the problem areas. More particularly, it can be seen that the bushing 40 according to the invention generally comprises an annular ring portion 42 and a generally oblong flange portion 44. For reasons which will become apparent as the description continues, the flange portion 44 is thickest on a first side 46 of the ring portion 42 and tapers down to a thinner section 47 most distal from the ring portion 42. Similarly it will be noted that the flange portion 44 is narrowest in the area surrounding the ring portion 42 and generally grows wider to a rounded end portion 48. In FIG. 3 it can be seen that the flange 44 has a hollow portion 50 in the underside thereof. This is primarily to aid in solidification process during casting, as well as reducing the weight of the bushing and the amount of material needed to manufacture the bushing. The bushing according to the invention is preferably machined from a casting to provide for a stronger member than possible with previously known DOM bushings.

As can be seen in FIG. 1 the bushings according to the present invention are employed on the loader at the anchor points 30 and 34 at the knee area of the boom 14. Further the bushings 40 are oriented so that the flange portion 44 supports the ring portion 42 and distributes the load along the weld when under the greatest stress.

Figure 5:
FIG. 5 is a color illustration depicting the results of a finite element analysis of a prior art bushing; and, FIG. 6 is a color illustration depicting the results of a finite element analysis of the bushing according to the invention.

With reference now to FIG. 5 a finite element analysis of loading on prior art bushings indicates areas of greatest stress on such joints. The purpose of the FEA analysis is to investigate the stress state around the prior art bushing and to investigate the effect of the proposed invention.

To investigate the bushings, a sub-model of the knee area of a loader was created. This sub-model includes a cylinder end and cross pin (modeled as a single part) the knee plates, the bushings and the weld. The edges of the knee plate where it is welded to the front and rear boom were constrained. A pressure load was applied to the end of the cylinder to simulate a system pressure boom extend load case. Non-linear contact elements were applied to the OD of the pin and the ID of the bushing. Bonded contact elements were created between the pin, bushing and side plate to simulate the weld penetration.

Figure 6:
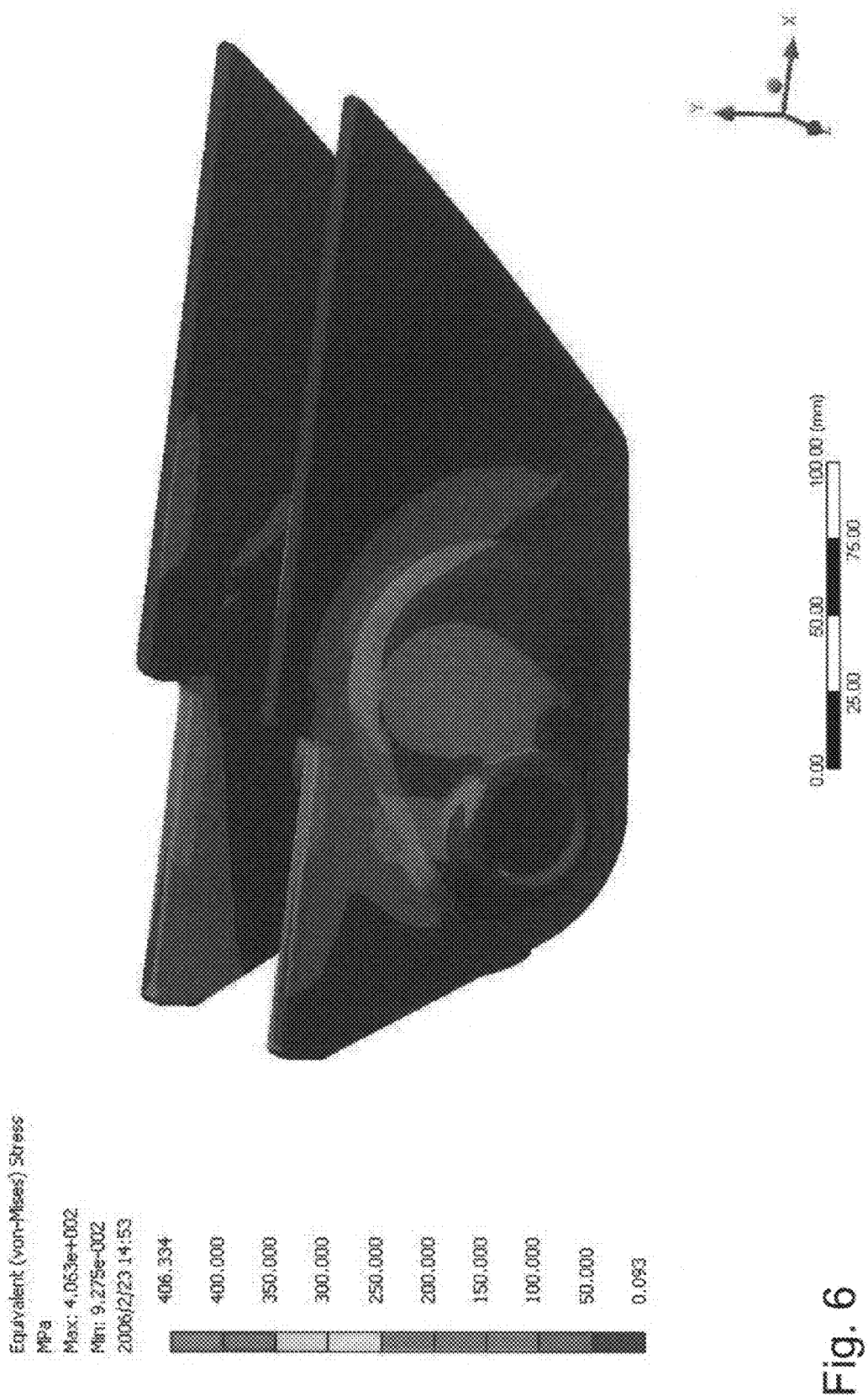

The first model (FIG. 5) simulated a cycle test geometry. With this design the bushings sat on the outside of the knee plates and portion of the pin passing through the plate was unsupported. The second model (FIG. 6) used the 'winged' or flanged bushing according to the invention that sat on the outside surface of the plate. The increased perimeter of the flange resulted in a larger weld area to transfer the weld between the bushing and the knee plate.

Both models featured similar displacement patterns. The pressure on the cylinder would force the pin against the inside of the bushing. This would cause the plates to bend outwards. A coefficient of friction of 0.1 was used in the contact areas, but this did not prevent the plates from bending outwards.

The results show high stress levels in the area where welds have cracked during cycle tests. A large area with stress above 350 MPa can be seen in FIG. 5 at the toe of the weld with the peak stress reaching above 400 MPa. The location of the high stress from the FEA results correlates very well with the crack locations from previous cycle tests.

The larger weld area of the winged or flanged bushing according to the invention has a very positive effect on the stress in the weld. The results shown in FIG. 6 indicate that the stress in this area dropped into the 100-150 MPa range. The high stress seen in the contact zone on the ID of the bushing is to be expected. Because of the design of the bushing, a small area on the side of the bushing can be seen on the top side of the casting. The pressure load from the pin creates bending resulting in the area of higher stress.

The flexibility of a casting process allows a geometry change to be made to address the high stress seen in the previous results. Material is added in the transition from the bushing to the flat area of the casting. To save weight, the bottom side of the casting is hollowed out. The results show that the changes made to the top of the casting eliminated the areas of higher stress.

Further, the larger weld area of the casting addresses the initial problem of high stress on the weld. The upper surface provides better support for the bushing portion of the part. The thicker wall in the contact area and the larger radius reduced the high stresses in the hollow cut out.

The high stress area seen in the FEA results correlated well with the crack location from the cycle fixture test. The flush mounted bushing design resulted in the highest stress in the weld around the bushing. The cast bushing design according to the invention results lower stresses in the weld around the bushing.

Stress in the bushing weld at the pinned joint is reduced to an acceptable level so as to achieve a the design life goal. This accomplished by a machined casting that puts more material and weld in the direction of loading.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A directional bushing for supporting a pinned joint of an articulated structure, the bushing having an annular ring portion and an oblong flange portion, the flange portion being thicker in an area adjacent to said annular ring portion and tapering to a thinner area more distal from the annular ring portion, the flange portion having opposed side edges that diverge angularly outward from the annular ring portion, the side edges being continuous with a rounded end edge, the flange portion being surface weldable to the structure at the pinned joint so that the flange portion extends in a direction of pin loading so that loads are transferred from the ring portion to the flange portion whereby the load is spread over a larger weld area.

2. A directional bushing as set forth in claim 1 wherein the bushing includes a hollowed out portion in an underside of the flange portion.

3. A directional bushing as set forth in claim 1 wherein the bushing is machined from a cast member.

4. An improved articulating work implement for use with a work vehicle, the work implement having a boom arm connected to a mounting frame, a work tool pivotally mounted to the boom arm, a first hydraulic cylinder connected between the boom arm and the frame, the first hydraulic cylinder being connected to the boom arm at a first pinned joint, a second hydraulic cylinder connected between the boom arm and the tool, the second hydraulic cylinder being connected to the boom arm at a second pinned joint, such that selective actuation of the hydraulic cylinders causes the boom arm and tool to articulate relative to the frame, the improvement comprising:

a directional bushing provided on the boom arm at each of the first and second pinned joints, the bushing having an annular ring portion and an oblong flange portion, the flange portion being thicker in an area adjacent to said annular ring portion and tapering to a thinner area more distal from the annular ring portion, the flange portion having opposed side edges that diverge angularly outward from the annular ring portion, the side edges being continuous with a rounded end edge, the flange portion being surface welded to the second boom at each pinned joint so that the flange portion extend in a direction of pin loading when the boom arm is extended.

5. An improved work implement as set forth in claim 4 wherein the bushing includes a hollowed out portion in an underside of the flange portion.

6. An improved work implement as set forth in claim 4 wherein the bushing is machined from a cast member.

* * * * *